United States Patent
Pallas et al.

(10) Patent No.: US 10,326,204 B2
(45) Date of Patent: Jun. 18, 2019

(54) SWITCHABLE, OSCILLATING NEAR-FIELD AND FAR-FIELD ANTENNA

(71) Applicant: Cisco Technology, Inc., San Jose, CA (US)

(72) Inventors: Derrick Pallas, San Francisco, CA (US); Ian Snyder, San Francisco, CA (US); Joshua Markell, San Francisco, CA (US); Morgan Teachworth, San Francisco, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 205 days.

(21) Appl. No.: 15/258,940

(22) Filed: Sep. 7, 2016

(65) Prior Publication Data

US 2018/0069311 A1 Mar. 8, 2018

(51) Int. Cl.
| | | |
|---|---|---|
| H01Q 7/00 | (2006.01) | |
| H01Q 1/22 | (2006.01) | |
| H04B 5/00 | (2006.01) | |
| H04W 4/02 | (2018.01) | |
| G06K 7/10 | (2006.01) | |
| G06K 19/077 | (2006.01) | |

(52) U.S. Cl.
CPC ............ *H01Q 7/00* (2013.01); *G06K 7/10356* (2013.01); *G06K 19/077* (2013.01); *H01Q 1/2208* (2013.01); *H04B 5/0025* (2013.01); *H04W 4/025* (2013.01)

(58) Field of Classification Search
CPC ....... H01Q 1/2208; H01Q 7/00; H01B 5/0025
USPC ........................................................ 343/742
See application file for complete search history.

(56) References Cited

U.S. PATENT DOCUMENTS

| | | |
|---|---|---|
| 4,236,068 A | 11/1980 | Walton |
| 5,642,303 A | 6/1997 | Small et al. |
| 5,751,223 A | 5/1998 | Turner |
| 6,812,824 B1 | 11/2004 | Goldinger et al. |
| D552,603 S | 10/2007 | Tierney |
| 7,843,347 B2* | 11/2010 | Nikitin ............... H01Q 1/2208 340/10.1 |
| D637,569 S | 5/2011 | Desai et al. |

(Continued)

FOREIGN PATENT DOCUMENTS

WO    WO 2013/020126    2/2013

OTHER PUBLICATIONS

"I Love WiFi, The difference between L2 and L3 Roaming Events," Apr. 1, 2010, 6 pages.

(Continued)

*Primary Examiner* — Huedung X Mancuso
(74) *Attorney, Agent, or Firm* — Polsinelli PC (57) ABSTRACT

Disclosed is a system and method of a switchable, oscillating near-field and far-field antenna that may be used in access control systems. A controller is coupled to a transceiver, wherein the transceiver comprises an antenna module that includes both a near-field antenna and a far-field antenna. The near-field antenna is a subset of the far-field antenna, and the controller is adapted to cause the antenna module to oscillate between a near-field configuration and a far-field configuration while, for example, scanning an RFID tag of a wireless asset and receiving one or more return signals from the RFID tag, in order to determine a location of the wireless asset based on the one or more return signals.

20 Claims, 5 Drawing Sheets

(56) References Cited

U.S. PATENT DOCUMENTS

| | | | |
|---|---|---|---|
| 8,010,079 B2 | 8/2011 | Mia et al. | |
| 8,102,814 B2 | 1/2012 | Rahman et al. | |
| 8,169,312 B2* | 5/2012 | Frederick | G01S 13/58 340/10.1 |
| 8,260,320 B2 | 9/2012 | Herz | |
| 8,284,748 B2 | 10/2012 | Borghei | |
| 8,300,594 B1 | 10/2012 | Bernier et al. | |
| 8,325,626 B2 | 12/2012 | Tóth et al. | |
| 8,396,485 B2 | 3/2013 | Grainger et al. | |
| 8,458,184 B2 | 6/2013 | Dorogusker et al. | |
| D691,636 S | 10/2013 | Bunton | |
| 8,549,638 B2 | 10/2013 | Aziz | |
| 8,644,301 B2 | 2/2014 | Tamhankar et al. | |
| 8,669,902 B2 | 3/2014 | Pandey et al. | |
| 8,676,182 B2 | 3/2014 | Bell et al. | |
| 8,682,279 B2 | 3/2014 | Rudolf et al. | |
| 8,718,644 B2 | 5/2014 | Thomas et al. | |
| 8,849,283 B2 | 9/2014 | Rudolf et al. | |
| 8,958,318 B1 | 2/2015 | Hastwell et al. | |
| 9,060,352 B2 | 6/2015 | Chan et al. | |
| 9,130,859 B1 | 9/2015 | Knappe | |
| D744,464 S | 12/2015 | Snyder et al. | |
| 9,268,980 B2* | 2/2016 | Tsuchida | G06K 7/10089 |
| 9,323,965 B2* | 4/2016 | Yang | G06K 7/10198 |
| 9,325,080 B2* | 4/2016 | Ouyang | H01Q 21/30 |
| D757,424 S | 5/2016 | Phillips et al. | |
| 9,342,716 B2* | 5/2016 | Raptis | G06K 7/10128 |
| D759,639 S | 6/2016 | Moon et al. | |
| D767,548 S | 9/2016 | Snyder et al. | |
| D776,634 S | 1/2017 | Lee et al. | |
| 9,642,167 B1 | 5/2017 | Snyder et al. | |
| 9,654,344 B2 | 5/2017 | Chan et al. | |
| 9,820,105 B2 | 11/2017 | Snyder et al. | |
| D804,450 S | 12/2017 | Speil et al. | |
| 9,933,224 B2 | 2/2018 | Dumitriu et al. | |
| 9,923,780 B2 | 3/2018 | Rao et al. | |
| 9,967,906 B2 | 5/2018 | Verkaik et al. | |
| 9,980,220 B2 | 5/2018 | Snyder et al. | |
| 9,985,837 B2 | 5/2018 | Rao et al. | |
| 2003/0087645 A1 | 5/2003 | Kim et al. | |
| 2003/0116634 A1 | 6/2003 | Tanaka | |
| 2004/0203572 A1 | 10/2004 | Aerrabotu et al. | |
| 2005/0090225 A1 | 4/2005 | Muehleisen et al. | |
| 2005/0169193 A1 | 8/2005 | Black et al. | |
| 2005/0186904 A1 | 8/2005 | Kowalski et al. | |
| 2006/0022815 A1 | 2/2006 | Fischer et al. | |
| 2006/0030290 A1 | 2/2006 | Rudolf et al. | |
| 2006/0092964 A1 | 5/2006 | Park et al. | |
| 2006/0126882 A1 | 6/2006 | Deng et al. | |
| 2006/0187866 A1 | 8/2006 | Werb et al. | |
| 2007/0037605 A1 | 2/2007 | Logan | |
| 2007/0239854 A1 | 10/2007 | Janakiraman et al. | |
| 2008/0037715 A1 | 2/2008 | Prozeniuk et al. | |
| 2008/0084888 A1 | 4/2008 | Yadav et al. | |
| 2008/0101381 A1 | 5/2008 | Sun et al. | |
| 2008/0163207 A1 | 7/2008 | Reumann et al. | |
| 2008/0233969 A1 | 9/2008 | Mergen | |
| 2008/0238621 A1* | 10/2008 | Rofougaran | H04B 5/0012 340/10.1 |
| 2008/0238686 A1* | 10/2008 | Tuttle | G06K 7/0008 340/572.7 |
| 2009/0129389 A1 | 5/2009 | Halna DeFretay et al. | |
| 2009/0203370 A1 | 8/2009 | Giles et al. | |
| 2009/0282048 A1 | 11/2009 | Ransom et al. | |
| 2009/0298511 A1 | 12/2009 | Paulson | |
| 2009/0307485 A1 | 12/2009 | Weniger et al. | |
| 2010/0039280 A1 | 2/2010 | Holm et al. | |
| 2010/0097969 A1 | 4/2010 | De Kimpe et al. | |
| 2010/0127828 A1* | 5/2010 | Connolly | G06K 7/0008 340/10.1 |
| 2010/0216412 A1* | 8/2010 | Rofougaran | H04B 1/0003 455/78 |
| 2010/0328038 A1* | 12/2010 | Kato | G06K 7/10356 340/10.1 |
| 2011/0087799 A1 | 4/2011 | Padhye et al. | |
| 2011/0142053 A1 | 6/2011 | Van Der Merwe et al. | |
| 2011/0182295 A1 | 7/2011 | Singh et al. | |
| 2011/0194553 A1 | 8/2011 | Sahin et al. | |
| 2011/0228779 A1 | 9/2011 | Goergen | |
| 2012/0023552 A1 | 1/2012 | Brown et al. | |
| 2012/0054367 A1 | 3/2012 | Ramakrishnan et al. | |
| 2012/0088476 A1 | 4/2012 | Greenfield | |
| 2012/0115512 A1 | 5/2012 | Grainger et al. | |
| 2012/0157126 A1 | 6/2012 | Rekimoto | |
| 2012/0167207 A1 | 6/2012 | Beckley et al. | |
| 2012/0182147 A1 | 7/2012 | Forster | |
| 2012/0311127 A1 | 12/2012 | Kandula et al. | |
| 2012/0324035 A1 | 12/2012 | Cantu et al. | |
| 2013/0029685 A1 | 1/2013 | Moshfeghi | |
| 2013/0039391 A1 | 2/2013 | Skarp | |
| 2013/0057435 A1 | 3/2013 | Kim | |
| 2013/0077612 A1 | 3/2013 | Khorami | |
| 2013/0088983 A1 | 4/2013 | Pragada et al. | |
| 2013/0107853 A1 | 5/2013 | Pettus et al. | |
| 2013/0108263 A1 | 5/2013 | Srinivas et al. | |
| 2013/0115916 A1 | 5/2013 | Herz | |
| 2013/0145008 A1 | 6/2013 | Kannan et al. | |
| 2013/0155906 A1 | 6/2013 | Nachum et al. | |
| 2013/0191567 A1 | 7/2013 | Rofougaran et al. | |
| 2013/0203445 A1 | 8/2013 | Grainger et al. | |
| 2013/0217332 A1 | 8/2013 | Altman et al. | |
| 2013/0273938 A1 | 10/2013 | Ng et al. | |
| 2013/0317944 A1 | 11/2013 | Huang et al. | |
| 2013/0322438 A1 | 12/2013 | Gospodarek et al. | |
| 2013/0343198 A1 | 12/2013 | Chhabra et al. | |
| 2013/0347103 A1 | 12/2013 | Veteikis et al. | |
| 2014/0007089 A1 | 1/2014 | Bosch et al. | |
| 2014/0016926 A1 | 1/2014 | Soto et al. | |
| 2014/0025770 A1 | 1/2014 | Warfield et al. | |
| 2014/0052508 A1 | 2/2014 | Pandey et al. | |
| 2014/0059655 A1 | 2/2014 | Beckley et al. | |
| 2014/0087693 A1 | 3/2014 | Walby et al. | |
| 2014/0105213 A1 | 4/2014 | A K et al. | |
| 2014/0118113 A1 | 5/2014 | Kaushik et al. | |
| 2014/0148196 A1 | 5/2014 | Bassan-Eskenazi et al. | |
| 2014/0179352 A1 | 6/2014 | V.M. et al. | |
| 2014/0191868 A1 | 7/2014 | Ortiz et al. | |
| 2014/0198808 A1 | 7/2014 | Zhou | |
| 2014/0233460 A1 | 8/2014 | Pettus et al. | |
| 2014/0269321 A1 | 9/2014 | Kamble et al. | |
| 2014/0302869 A1 | 10/2014 | Rosenbaum et al. | |
| 2014/0337824 A1 | 11/2014 | St. John et al. | |
| 2014/0341568 A1 | 11/2014 | Zhang et al. | |
| 2015/0016286 A1 | 1/2015 | Ganichev et al. | |
| 2015/0016469 A1 | 1/2015 | Ganichev et al. | |
| 2015/0030024 A1 | 1/2015 | Venkataswami et al. | |
| 2015/0043581 A1 | 2/2015 | Devireddy et al. | |
| 2015/0065161 A1 | 3/2015 | Ganesh et al. | |
| 2015/0087330 A1 | 3/2015 | Prechner et al. | |
| 2015/0103818 A1 | 4/2015 | Kuhn et al. | |
| 2015/0163192 A1 | 6/2015 | Jain et al. | |
| 2015/0172391 A1 | 6/2015 | Kasslin et al. | |
| 2015/0223337 A1 | 8/2015 | Steinmacher-Burow | |
| 2015/0256972 A1 | 9/2015 | Markhovsky et al. | |
| 2015/0264519 A1 | 9/2015 | Mirzaei et al. | |
| 2015/0280827 A1 | 10/2015 | Adiletta et al. | |
| 2015/0288410 A1 | 10/2015 | Adiletta et al. | |
| 2015/0326704 A1 | 11/2015 | Ko et al. | |
| 2015/0358777 A1 | 12/2015 | Gupta | |
| 2015/0362581 A1 | 12/2015 | Friedman et al. | |
| 2016/0007315 A1 | 1/2016 | Lundgreen et al. | |
| 2016/0044627 A1 | 2/2016 | Aggarwal et al. | |
| 2016/0127875 A1 | 5/2016 | Zampini, II | |
| 2016/0146495 A1 | 5/2016 | Malve et al. | |
| 2016/0344641 A1 | 11/2016 | Javidi et al. | |
| 2016/0371893 A1* | 12/2016 | Busch-Sorensen | G06K 7/10128 |
| 2017/0026974 A1 | 1/2017 | Dey et al. | |
| 2017/0186246 A1* | 6/2017 | Montealegre | G07B 15/02 |
| 2017/0214551 A1 | 7/2017 | Chan et al. | |
| 2018/0084389 A1 | 3/2018 | Snyder et al. | |

(56) References Cited

U.S. PATENT DOCUMENTS

OTHER PUBLICATIONS

Carter, Steve Sr., "E911 VoIP Essentials for Enterprise Deployments," XO Communications, LLC, 2012, 9 pages.
Chalise, Batu K., et al., "MIMO Relaying for Multiaccess Communication in Cellular Networks," Sensor Array and MultiChannel Signal Processing Workshop, 2008, SAM 2008, 5th IEEE, Jul. 21, 2008, pp. 146-150.
Cisco Systems, Inc., "Wi-FI Location-Based Services 4.1 Design Guide," May 20, 2008, 206 pages.
Cui, Wenzhi et al., "DiFS: Distributed Flow Scheduling for Data Center Networks," Nanjing University, China, Jul. 28, 2013, 10 pages.
Galvan T., Carlos E., et al., "Wifi bluetooth based combined positioning algorithm," International Meeting of Electrical Engineering Research ENIINVIE 2012, Procedia Engineering 35 (2012), pp. 101-108.
Gesbert, David, "Advances in Multiuser MIMO Systems (Tutorial Part II) Emerging Topics in Multiuser MIMO Networks," IEEE PIMRC Conference, Sep. 2007, 107 pages.
Halperin, Daniel, et al., "Augmenting Data Center Networks with Multi-Gigabit Wireless Links," Aug. 15-19, 2011, SIGCOMM'11, ACM 978-1-4503-0797-0/11/08, pp. 38-49.
Ji, Philip N., et al., "Demonstration of High-Speed MIMO OFDM Flexible Bandwidth Data Center Network," Optical Society of America, 2012, 2 pages.
Kandula, Srikanth, et al., "Flyways to De-Congest Data Center Networks," Microsoft Research, Oct. 23, 2009, 6 pages.
Katayama, Y. et al., "MIMO Link Design Strategy for Wireless Data Center Applications," IEEE Wireless Communications and Networking Conference: Services, Applications, and Business, 2012, 5 pages.
Leary, Jonathan, et al., "Wireless LAN Fundamentals: Mobility," Jan. 9, 2004, Cisco Press, 15 pages.
Network Heresy, "NVGRE, VXLAN and What Microsoft is Doing Right," Oct. 3, 2011, 5 pages.
Savvides, Andreas, et al., "Dynamic Fine-Grained Localization in Ad-Hoc Networks of Sensors", Proceeding MobiCom '01 Proceedings of the 7th annual international conference on Mobile computing and networking, Jul. 2001, pp. 166-179.
Partial European Search Report for the corresponding European Patent Application No. 17183681.0, from the European Patent Office, dated Feb. 28, 2018, 10 pages.
Extended European Search Report for the corresponding European Patent Application No. 17183681.0, from the European Patent Office, dated Jul. 9, 2018, 8 pages.

* cited by examiner

SWITCHABLE, OSCILLATING NEAR-FIELD AND FAR-FIELD ANTENNA

TECHNICAL FIELD

The present technology pertains to radio frequency (RF) antennas, and more specifically pertains to switchable near-field and far-field RF antennas.

BACKGROUND

Radio frequency (RF) signals are often used in RFID systems in order to communicate with one or more tags, for purposes such as security or tracking. In general, an RFID system uses a transceiver to broadcast an interrogation signal, which is received by any operable RFID tag within the operable range of the transceiver. Upon receiving the interrogation signal, each RFID tag transmits a response signal that encodes unique tag identification information and other stored data. RFID tags can be classified as either passive or active, depending on how they are powered—passive RFID tags are powered via an onboard DC converter that extracts energy from the interrogation signal, and active RFID tags are powered by an onboard battery.

In some applications, simply receiving a response signal is sufficient, as it indicates that the RFID tag (and any person or object associated with the tag) corresponding to the response signal is located within the boundaries defined by the range of the RFID transceiver. Greater granularity may be provided by transmitting each response signal at a known signal strength, given that signal strength decreases in a predictable manner. As such, the distance between the RFID transceiver and a source tag can be approximated by analyzing the signal strength of the response signal received at the transceiver.

RFID systems may be divided into near-field systems and far-field systems, each exhibiting unique properties and requiring a specific type of antenna. The most immediately observable distinction between near-field and far-field is the separation range between tag and transceiver over which the RFID system remains operable. Near-field systems, often found in card readers and other close proximity applications, are constrained to a separation on the order of inches and are polarization agnostic. Far-field systems, often found in asset or product tracking applications, operate at a separation on the order of feet and are polarization sensitive (unable to obtain a reading), particularly at close range. As such, there is a need for a radio frequency system with a single antenna that is operable in both the near-field and the far-field, thereby providing an increased effective range of operation and eliminating the blind spots inherent to each individual mode of operation.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed is an access control system comprising: a controller and a transceiver coupled to the controller, wherein the transceiver comprises an antenna module including a near-field antenna and a far-field antenna, and wherein the near-field antenna is a subset of the far-field antenna.

In one embodiment, the controller is configured to, using the transceiver, scan an RFID tag of a wireless asset and receive one or more return signals from the RFID tag, and determine a location of the wireless asset based on the one or more return signals.

In one embodiment, the controller is configured to receive two or more return signals from the RFID tag and determine a direction of the wireless asset based on the two or more return signals.

In one embodiment, the access control system further transmits position information corresponding with one or more of the location of the wireless asset and the direction of the wireless asset to a cloud controller, wherein the cloud controller is configured to receive position information from a plurality of networked asset control systems.

In one embodiment, scanning the RFID tag further comprises oscillating the antenna module between a near-field scanning mode and a far-field scanning mode, wherein the near-field scanning mode corresponds with activation of the near-field antenna, and the far-field scanning mode corresponds with activation of the far-field antenna.

In one embodiment, the return signal comprises signal strength and phase information associated with the RFID tag.

In one embodiment, the near-field antenna is a UHF near-field loop antenna.

Disclosed is a method for tracking a wireless asset, comprising scanning, using a transceiver, an RFID tag of a wireless asset, wherein the transceiver comprises an antenna module including a near-field antenna and a far-field antenna, receiving one or more return signals from the RFID tag, and determining a location of the wireless asset based on the one or more return signals.

In one embodiment, the near-field antenna is a subset of the far-field antenna.

In one embodiment, the method further comprises receiving two or more return signals from the RFID tag and determining a direction of the wireless asset based on the two or more return signals.

In one embodiment, the method further comprises transmitting position information corresponding with one or more of the location of the wireless asset and a direction of the wireless asset to a cloud controller, wherein the cloud controller is configured to receive position information from a plurality of networked asset control systems.

In one embodiment, scanning the RFID tag further comprises oscillating the antenna module between a near-field scanning mode and a far-field scanning mode, wherein the near-field scanning mode corresponds with activation of the near-field antenna, and wherein the far-field scanning mode corresponds with activation of the far-field antenna.

In one embodiment, the return signal comprises signal strength and phase information associated with the RFID tag.

Disclosed is a non-transitory computer-readable storage medium comprising instructions stored therein, which when executed by one or more processors, cause the processors to perform operations comprising scanning, using a transceiver, an RFID tag of a wireless asset, wherein the transceiver comprises an antenna module including a near-field antenna and a far-field antenna, receiving one or more return signals from the RFID tag, and determining a location of the wireless asset based on the one or more return signals.

In one embodiment, the near-field antenna is a subset of the far-field antenna.

In one embodiment, the processor is further configured to perform operations comprising receiving two or more return signals from the RFID tag and determining a direction of the wireless asset based on the two or more return signals.

In one embodiment, the processor is further configured to perform operations comprising transmitting position information corresponding with one or more of the location of the wireless asset and a direction of the wireless asset to a cloud controller, wherein the cloud controller is configured to receive position information from a plurality of networked asset control systems.

In one embodiment, scanning the RFID tag further comprises oscillating the antenna module between a near-field scanning mode and a far-field scanning mode, wherein the near-field scanning mode corresponds with activation of the near-field antenna, and wherein the far-field scanning mode corresponds with activation of the far-field antenna.

In one embodiment, the return signal comprises signal strength and phase information associated with the RFID tag.

In one embodiment, the near-field antenna is a UHF near-field loop antenna.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that these implementations are provided for illustrative purposes only. A person skilled in the relevant art will recognize that other components and configurations may be used without departing from the spirit and scope of the disclosure.

Figure 1:
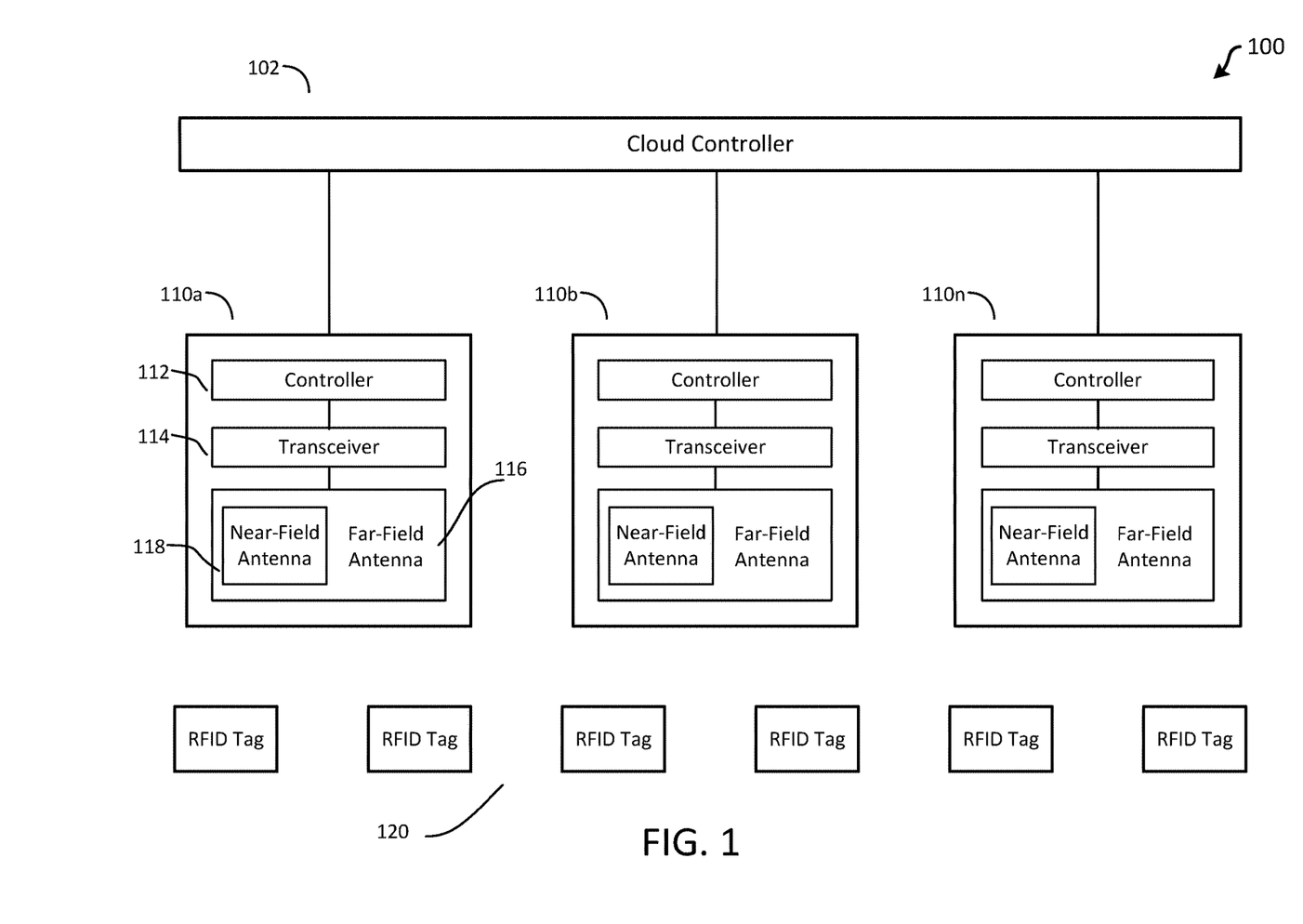
FIG. 1 illustrates an exemplary configuration of an environment in which an access control system of the present disclosure may operate.

The disclosed access control system and method are best understood in the context of the larger environment in which they operate. Accordingly, FIG. 1 depicts an illustrative schematic diagram of an access control system 100 and its constituent components. Broadly, the access control system may be broken down into three constituent components: a cloud controller 102, some number n of access control readers 110a-110n, and a plurality of wireless assets 120 (illustrated here as RFID tags, although it is understood that a variety of other radio-frequency (RF) devices or wireless identification tags may be used). Although access control system 100 is not illustrated with respect to any specific implementation, by means of example, such an access control system may be used for purposes such as asset tracking in a factory, warehouse, or other commercial building, wherein integrated or externally attached RFID tags are used to track the flow of packages or other goods, or for a building security system, wherein RFID tags are embedded into identification cards and used to verify and grant individual access to locked doors or other secured assets.

Returning to FIG. 1, and turning first to cloud controller 102, a number of different configurations may be employed. As illustrated, cloud controller 102 is communicatively coupled with each of the access control readers 110a-110n via a direct link, although in some embodiments, cloud controller 102 may be communicatively coupled with one or more of the access control readers 110a-110n via an indirect link, wherein one or more intermediate nodes or access control readers are communicatively coupled between cloud controller 102 and the destination access control reader. As used herein, communicatively coupled is understood to mean any data transmission link between two or more computing devices or components, wired or wireless. Examples of such data transmission links include, but are not limited to, a Local Area Network (LAN), a Wide Area Network (WAN), Intranet, Internet, or any other wired or wireless networking and data transmission technologies that are known in the art.

In some embodiments, cloud controller 102 and the access control readers 110a-110n may be provided separately, in order to provide increased security and reliability. For example, cloud controller 102 may be located on a separate network from that of the access control readers 110a-110n, such that both networks much be breached or otherwise compromised in order for access control system 100 to be defeated. In some embodiments, cloud controller 102 may be physically remote from access control readers 110a-110n, which can increase security and provide greater operational flexibility by allowing the access control system 100 to be operated and monitored constantly, for example through a secure web portal or web application.

In general operation, cloud controller 102 is provided in a tiered hierarchy, such that it is above each of the access control readers 110a-110n. In some embodiments, cloud controller 102 and the access control readers 110a-110n can exist in a master-slave relationship, wherein cloud controller 102 oversees all aspects of operation for each of the access control readers. However, cloud controller 102 is not limited to such a master-slave relationship, and it is understood that the access control readers may be capable of a partial or total degree of autonomy in their operation (provided, for example, via controller 112 contained within access control reader 110a), such that cloud controller 102 only assumes a supervisory role, such as monitoring for any abnormal events or other deviations from expected operation.

Cloud controller 102 may be provided on a single computing device, such as a computer server, or cloud controller 102 may be provided across a plurality of different computing devices that comprise, for example, a cloud computing cluster. As further example, cloud controller 102 may be implemented as a central processing unit (CPU), a microcontroller (MCU), a microprocessor, integrated circuitry, or any other controller known in the art. In some embodiments, cloud controller 102 may be connected to a database (not shown) that can store historical records of each interaction between the plurality of RFID tags 120 and the access control readers 110a-110n. The database may also be used to store one or more access control policies, with a specific access control policy being manually selectable (and editable) by an administrator of access control system 100, or being automatically selectable according to one or more pre-defined rules, based on criteria such as time or location.

Turning next to access control readers 110a-110n, it is understood that access control system 100 contains some number n of access control readers, that may be physically identically or otherwise capable of providing substantially similar functionality. Each access control reader may be associated with a certain access point, and any given access point may be associated with one or more access control readers. As depicted in FIG. 1, each of the access control readers 110a-110n is illustrated in an identical schematic form, and the following description will be made with reference to access control reader 110a, but is extensible to each of the access control readers 110a-110n.

Access control reader 110a consists of three primary components: a controller 112, a transceiver 114, and a far-field antenna 116. A near-field antenna 118 is formed from a subset of far-field antenna 116, as will be subsequently explained in greater depth. Controller 112 may be provided by a processing element, capable of implementing programmed commands that may be edited or modified by an administrator of access control system 100. In some embodiments, controller 112 may simply receive one or more control commands from cloud controller 102 and execute them accordingly.

As illustrated, transceiver 114 is coupled to controller 112, and is capable of transmitting and receiving RF or other electromagnetic (EM) signals, as is understood by one of ordinary skill in the art. The signal processing required to support this transmitting and receiving functionality may be performed by a processing element of controller 112 or a processing element of cloud controller 102 In some embodiments, transceiver 114 may contain its own signal processing element, particularly in a large access control system where it may be impractical to perform signal processing at controller 112 or cloud controller 102.

Transceiver 114 is further coupled to far-field antenna 116, which is used to interact with one or more of the plurality of RFID tags. In some embodiments, far-field antenna 116 has an operable range of up to 30 feet, although it is understood that the operable range of far-field antenna 116 may depend upon a number of different factors such as the operating wavelength of access control system 100, the physical geometry of the access point at which far-field antenna 116 is located, the polarization of access control reader 110a and the polarization of a given RFID tag.

Near-field antenna 118 is formed from a subset of far-field antenna 116, which may be achieved by selectively energizing a certain portion of far-field antenna 116, as will be explained with respect to FIG. 2. This selective energization may be controlled by controller 112, cloud controller 102, or some combination of the two. When near-field antenna 118 is energized, it may have an operational range of approximately 18 inches, although once again, it is understood that this operable range may depend upon a number of different factors as would be appreciated by one of ordinary skill in the art. Each of far-field antenna 116 and near-field antenna 118 may interact with one or more of the plurality of RFID tags 120 in order to perform a read operation, and multiple RFID tags may be read simultaneously. In one aspect of the disclosure, access control reader 110a may oscillate between energizing far-field antenna 116 and energizing near-field antenna 118, in order to provide an improved and more reliable tracking of the plurality of RFID tags 120.

Figure 2A:
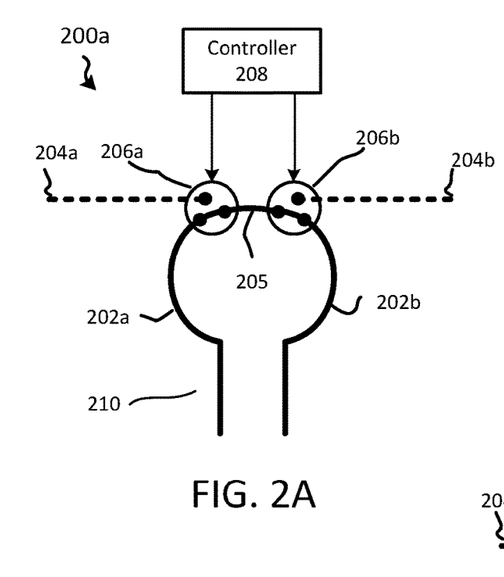
FIG. 2A illustrates a near-field antenna configuration of the switchable, oscillating antenna of the present disclosure.
Figure 2B:
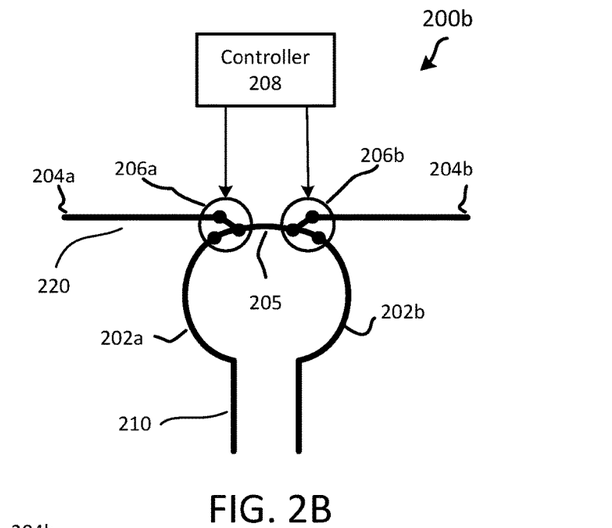
FIG. 2B illustrates a combined near-field and far-field antenna configuration of the switchable, oscillating antenna of the present disclosure.
Figure 2C:
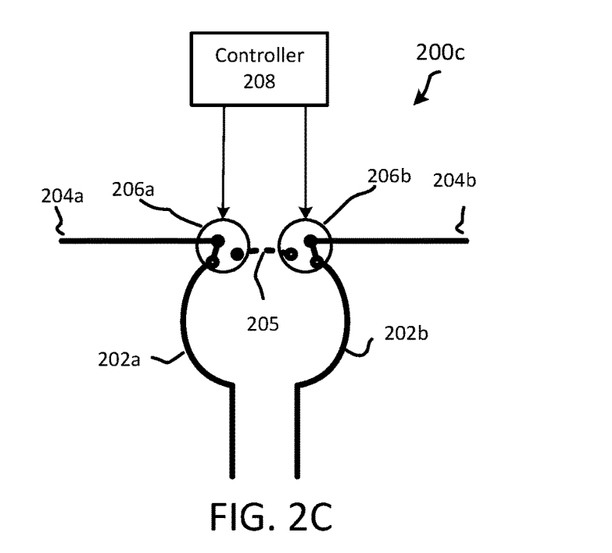
FIG. 2C illustrates a far-field antenna configuration of the switchable, oscillating antenna of the present disclosure.

Turning now to FIG. 2A-2C, three different antenna configurations are illustrated, wherein each of the distinct antenna configurations can be achieved using the same set of physical antenna components, as indicated by the numerical labeling common to the three figures. For clarity of explanation, each configuration is presented in a simplified diagrammatic form, wherein a solid line indicates an energized antenna portion and a dashed line indicates a non-energized antenna portion.

FIG. 2A depicts a near-field antenna configuration 200a, wherein only a near-field loop antenna is energized. FIG. 2B depicts a combined near-field and far-field antenna configuration 200b, in which a near-field loop antenna and a far-field antenna are energized. FIG. 2C depicts a far-field antenna configuration 200c, wherein only a far-field loop antenna is energized.

In a first embodiment, access control reader 110a may oscillate between near-field antenna configuration 200a and combined near-field and far-field antenna configuration 200b. In a second embodiment, access control reader 110a may oscillate between near-field antenna configuration 200a and far-field antenna configuration 200c. The oscillation may take place on the order of 20-200 Hz, wherein a greater oscillation frequency can provide a greater resolution with respect to the movement and position of a given RFID tag in the vicinity of access control reader 110a, although it is understood that other oscillation frequencies may be implemented as needed or as desired for a given application.

This oscillation is governed by an oscillation controller 208, which is coupled to switches 206a and 206b in order to selectively energize the desired antenna components. Switches 206a and 206b may be mechanical or solid-state switches, depending on the specific application in which they are used. Oscillation controller 208 may be provided by controller 112 or by cloud controller 102, as explained previously. Oscillation controller 208 may also be a stand-alone component, equipped to receive control or timing commands from one or more of controller 112 and cloud controller 102.

In near-field antenna configuration 200a, switches 206a and 206b are positioned such that only a near-field loop antenna 210 is energized, wherein near-field loop antenna 210 is formed from a series connection between first loop portion 202a, a bridge portion 205, and a second loop portion 202b. Although FIG. 2A depicts only a single near-field loop antenna 210, some embodiments may make use of one or more near-field loop antennas. In some embodiments, the one or more near-field loop antennas may be provided as Ultra High Frequency (UHF) antennas. As illustrated, the distal ends of first loop portion 202a and second loop portion 202b are left unconnected, but in operation, may be connected to a matching or tuning network, as would be understood by one of ordinary skill in the art.

In such a configuration, first loop portion 202a is connected as a feed and second loop portion 202b is connected as a ground (or vice versa). When near-field loop antenna 210 is energized, an RF signal is sent to the feed loop portion. Based on the length and tuning of near-field loop antenna 210, this RF signal is matched such that there is an even current distributed across the loop and then grounded, causing an RF field to be generated. This RF field radiates perpendicular to the center of the loop, to a height that is proportional to the diameter of the loop, thereby defining a three-dimensional read-zone in which near-field loop antenna 210 is able to read an RFID tag. As mentioned previously, this read-zone may extend approximately 18-24 inches away from one or more of the center of near-field loop antenna 210 or the plane containing antenna 210, but in general is limited to four inches away in the absence of a high-powered near-field antenna. The specific geometry of this RF field or read-zone can be further adjusted by varying the shape and polarity of antenna 210; by varying the current and manner in which it is driven through the loop; and through a variety of other factors as would be appreciated by one of ordinary skill in the art.

On the basis of this 18-24 inch read-zone, near-field loop antenna 210 is more ideally situated for applications such as door locks or other applications that will predictably involve contact or close proximity between access control reader 210a and an RFID tag. In such applications, a read signal received at access control reader 210a can generally be taken to indicate that a given RFID tag (and the individual or object associated with it) is located at an access point controlled by access control reader 210a and is further seeking to enter the access point.

As such, near-field loop antenna 210 is useful for performing the actual validating step for granting or denying access to an access point, but due to its limited range and small read-zone, is ultimately ineffective for tracking the movement of assets such as individuals or objects. In general, an access control reader that only makes use of a near-field antenna can only track actual attempts to access the access point. In other words, a near-field access control reader can only log the RFID tags that were placed within the read-zone and either granted or denied access. A near-field only access control reader may fail to log any tags and associated assets that are exiting the access point, unless an additional access control reader is installed, creating additional expense and further slowing the rate at which assets may enter and exit the access point.

Combined near-field and far-field antenna configuration 200b addresses this issue. In this configuration, as seen in FIG. 2B, controller 208 adjusts switches 206a and 206b in order to additionally energize (with respect to near-field antenna configuration 200a) a first far-field portion 204a and a second far-field portion 204b, thereby forming a combined near-field and far-field antenna 220.

Combined antenna 220 has a far greater operational range than near-field loop antenna 210, capable of reading RFID tags at a range of approximately 30 feet. By virtue of this increased operational range, combined antenna 220 can be used to track RFID tags and their associated assets based on analyzing the signal strength of the return signal transmitted by a given RFID tag, where a given signal strength can be mapped to or otherwise correlated with a specific distance from the combined antenna 220. However, a single reading is often not helpful when taken in isolation, due to inherent challenges in far-field readings. For example, a return signal may experience unaccounted for attenuation if it passes through any medium other than air while traveling on a path between an originating RFID tag and a receiving antenna or access control point. In some instances, a return signal may experience multiple reflections before being received at an antenna or access control point. In both of these cases, the signal strength of the received return signal will be lower than what would otherwise be expected at the given distance between the originating RFID tag and receiving antenna or access control point, leading to an over-estimation of distance. In some embodiments, phase information associated with the return signal transmitted by the given RFID tag may be analyzed, either alone or in combination with the signal strength, as the phase information may be less affected by any attenuation effects in comparison to the signal strength.

Therefore, it can be more useful to take multiple readings of an RFID tag and calculate an average distance rather than an instantaneous distance, wherein the average distance and a true distance may converge at a higher sample rate (i.e. the oscillation frequency or the read frequency of the access control reader). In some embodiments, each reading of a given RFID tag can be saved at one or more of the access control reader and cloud controller 102, and likewise, the average distance calculation can be performed at one or more of the access control reader and cloud controller 102.

These saved readings can enable a number of additional calculations to be performed. For example, if an RFID tag is simultaneously in range of more than one of the access control readers 110a-110n, then an approximate triangulation of the position of the RFID tag and associated asset may be performed, based on known coordinates of the access control readers 110a-100n. In such an embodiment, the triangulation calculation is performed at cloud controller 102, as it requires the simultaneous collection and coordination of information from multiple access control readers.

A velocity or direction of the RFID tag and associated asset may also be calculated or approximated by analyzing a change in position or distance with respect to time. Such information can be useful, for example, in determining whether an RFID tag and its associated asset are approaching or moving away from an access point and access control reader. This determination may also be simultaneously made for one or more RFID tags and their associated assets, which can improve security by tracking and accounting for all assets entering or exiting the access point, rather than only tracking and accounting for the asset that presented an RFID tag for verification and authorization at the access control reader. For example, access control readers operable in only the near-field are vulnerable to what is commonly referred to as a "walk behind", wherein an authorized user may present an RFID tag to gain entrance to an access point such as a building and then allow other users, whether authorized or unauthorized, to enter at the same time.

In some embodiments, cloud controller 102 may be adapted to predict the movement or flow of assets on the basis of this position and velocity or direction data, which can prove critically important for scenarios such as alerting security personnel to a predicted attempt to enter a geofenced or otherwise restricted zone within an access control system. In some cases, this predictive data may be used to avoid or reduce bottlenecks in the flow of assets, whether humans or objects, which are passing through an access point, by either re-routing assets or providing increased throughput at the access point.

While the issue of reliability at medium to long-range is solved by taking an average of multiple samples, far-field antennas remain unreliable at short-range due to fundamental challenges presented by the polarities of the RFID tag and a far-field antenna. If a far-field antenna is provided in a fixed or static configuration within an access control reader, then so too is the polarity of the far-field antenna fixed or static (although some embodiments may provide for a variable far-field antenna polarity, at additional expense and complexity). For example, a far-field antenna may be provided with a fixed horizontal polarization. Such a horizontally polarized far-field antenna can generally read a horizontally polarized RFID tag at close range, including the 4-24 inch read-zone provided by the previously discussed near-field antenna 210.

However, a horizontally polarized far-field antenna cannot reliably or predictably read a vertically polarized RFID tag at close range, and will often fail to obtain any reading whatsoever when such a polarization offset exists between the RFID tag and far-field antenna. In many applications, such a failure to obtain a reading is unacceptable, and consequently, security-oriented access control readers rely solely upon near-field antennas, choosing a limited, but reliable, feature set over the enhanced, but sometimes unreliable, tracking features enabled by far-field antennas.

The presently disclosed access control system obviates any such issue or decision by providing a near-field antenna 210 that is a subset of a larger far-field antenna and oscillating between the two—thereby coupling the enhanced tracking and prediction of the far-field antenna with the high reliability of the near-field antenna. At 200 Hz, an access control system of the present disclosure can perform 100 near-field reads every second, using near-field antenna configuration 200a, and 100 far-field reads every second, using combined near-field and far-field antenna configuration 200b or far-field antenna configuration 200c. In some embodiments, the access control system may use other read frequencies, or other read patterns. For example, the access control system may perform a read pattern of five consecutive far-field reads and then one near-field read, wherein the read pattern is not limited to any specific read frequency. Such a read pattern may be desirable in environments with a large number of assets to be tracked in the far-field, particularly when viewed in comparison to the number of assets to be tracked in the near-field.

Far-field antenna configuration 200c, as seen in FIG. 2C, is largely identical to combined near-field and far-field antenna configuration 200b, with the difference being bridge portion 205, which is not energized in far-field antenna configuration 200c. Far-field antenna configuration 200c can provide the exact same functionality as that of the combined near-field and far-field antenna configuration 200b, described above, for example, achieving an operating range of approximately 30 feet. However, by virtue of the de-energized bridge portion 205, far-field antenna configuration 200c suffers from more pronounced difficulties and unreliability when reading RFID tags at short-range. While these reliability issues are still obviated by oscillating between near-field antenna configuration 200a and far-field antenna configuration 200c, it may sometimes be desirable to use combined near-field and far-field antenna configuration 200b in implementations where cost or engineering complexity are of a lesser concern.

Figure 3:
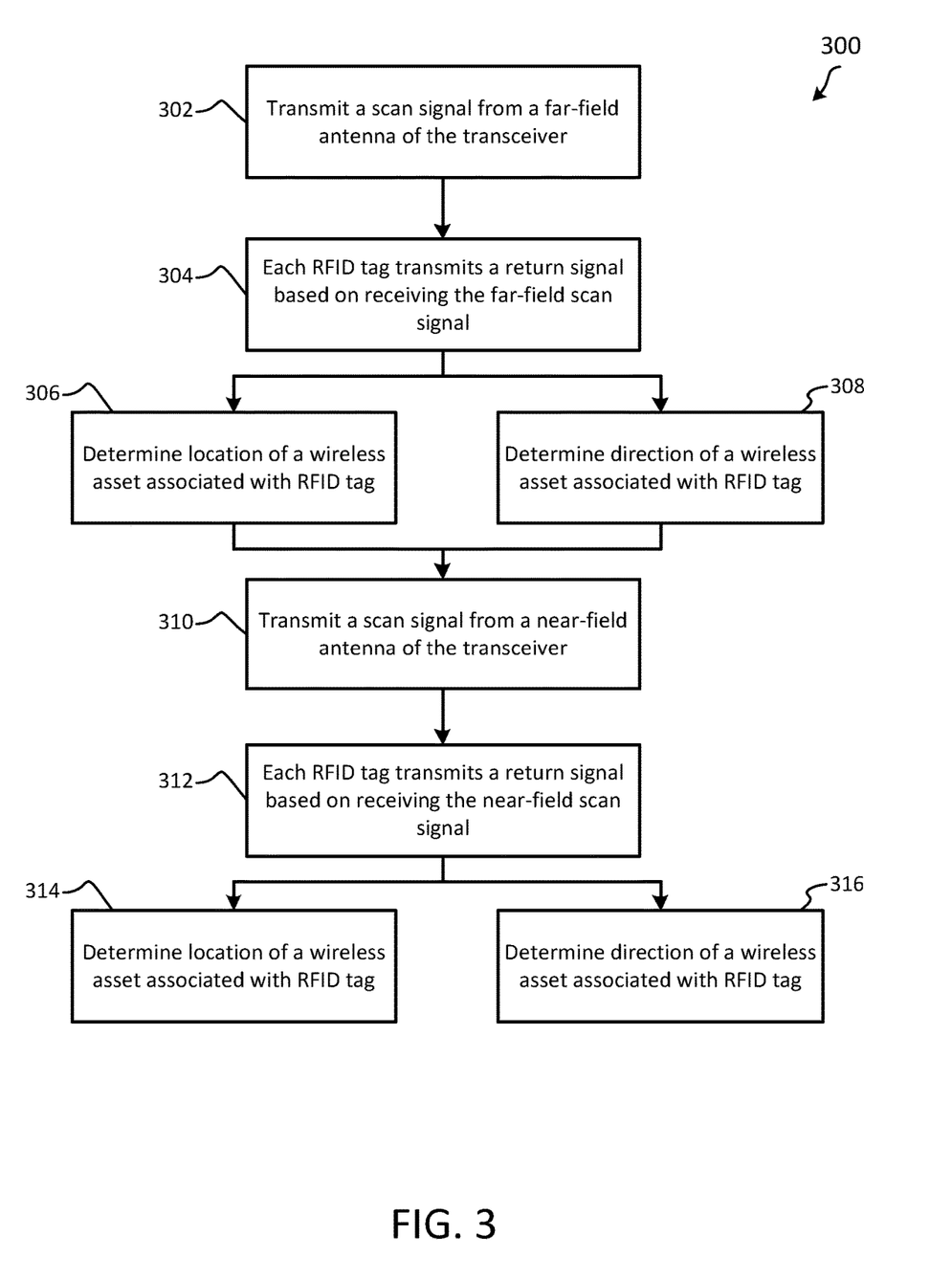
FIG. 3 illustrates a method of tracking wireless assets using the switchable, oscillating antenna of the present disclosure.

FIG. 3 illustrates a method 300 of tracking wireless assets by using a switchable, oscillating near-field and far-field antenna. Starting at a step 302, a far-field antenna is energized and used to transmit a scan signal into the area immediately surrounding the far-field antenna. As previously discussed, this far-field antenna may be coupled to or otherwise associated with a transceiver of an access control reader, and the access control reader may further be installed at an access point. Once transmitted, the scan signal propagates through the nearby area, with an effective range of approximately 30 feet from the point of transmission.

In a step 304, the scan signal is received by one or more RFID tags that are within the effective range of the far-field antenna. Upon receiving the scan signal, each RFID then transmits a unique return signal containing identification information and any other data that may be stored on the RFID tag. In some embodiments, passive RFID tags may be used, capturing energy from the received scan signal and using it to broadcast the return signal into the area immediately surrounding the RFID tag.

In a step 306, the transceiver receives return signals from the one or more RFID tags that received the scan signal of step 302. Using at least the information contained in the return signal, the location of a wireless asset associated with a given RFID tag is determined. For example, the signal strength of the return signal can be analyzed to determine a distance between the given RFID tag and the transceiver, and this distance can then be translated into a location.

In a step 308, which can be performed concurrent with or subsequent to step 306, a velocity or direction of a wireless asset associated with a given RFID tag is determined by analyzing a change in its location with respect to time. In some embodiments, the velocity or direction calculation can be used to predict a future position or destination of the wireless asset associated with the given RFID tag.

In a step 310, a near-field portion of the far-field antenna is energized, and transmits a near-field scan signal into the area immediately surrounding the near-field portion of the far-field antenna. Once transmitted, the near-field scan signal propagates through the nearby area, with an effective range of approximately 18-24 inches from the point of transmission.

In a step 312, the near-field scan signal is received by one or more RFID tags that are within the effective range of the near field portion of the far-field antenna. Upon receiving the near-field scan signal, each RFID then transmits a unique return signal containing identification information and any other data that may be stored on the RFID tag. In some embodiments, passive RFID tags may be used, capturing energy from the received near-field scan signal and using it to broadcast the return signal into the area immediately surrounding the RFID tag.

In a step 314, the transceiver receives return signals from the one or more RFID tags that received the near-field scan signal of step 310. Using at least the information contained in the return signal, the location of a wireless asset associated with a given RFID tag is determined. For example, the signal strength of the return signal can be analyzed to determine a distance between the given RFID tag and the transceiver, and this distance can then be translated into a location. In some embodiments, the determination of location may be binary in nature: the wireless asset associated with the given RFID tag is either contained within the effective range of the near-field scan signal, or the given RFID tag is located somewhere outside of the effective range of the near-field scan signal.

In a step 316, which can be performed concurrent with or subsequent to step 306, a velocity or direction of a wireless asset associated with a given RFID tag is determined by analyzing a change in its location with respect to time. In some embodiments, the velocity or direction calculation can be used to predict a future position or destination of the wireless asset associated with the given RFID tag. In some embodiments, this step may be omitted, as such information can be of limited use due to the small effective range of the near-field scan signal.

The above steps outline a single cycle of the switchable, oscillating near-field and far-field antenna of the present disclosure. Upon the completion of a cycle (at either step 314 or 316), the method may then return to step 302 and be repeated as desired. In some embodiments, the method is performed between 20 and 200 times a second, for an oscillation frequency of 20-200 Hz.

Figure 4:
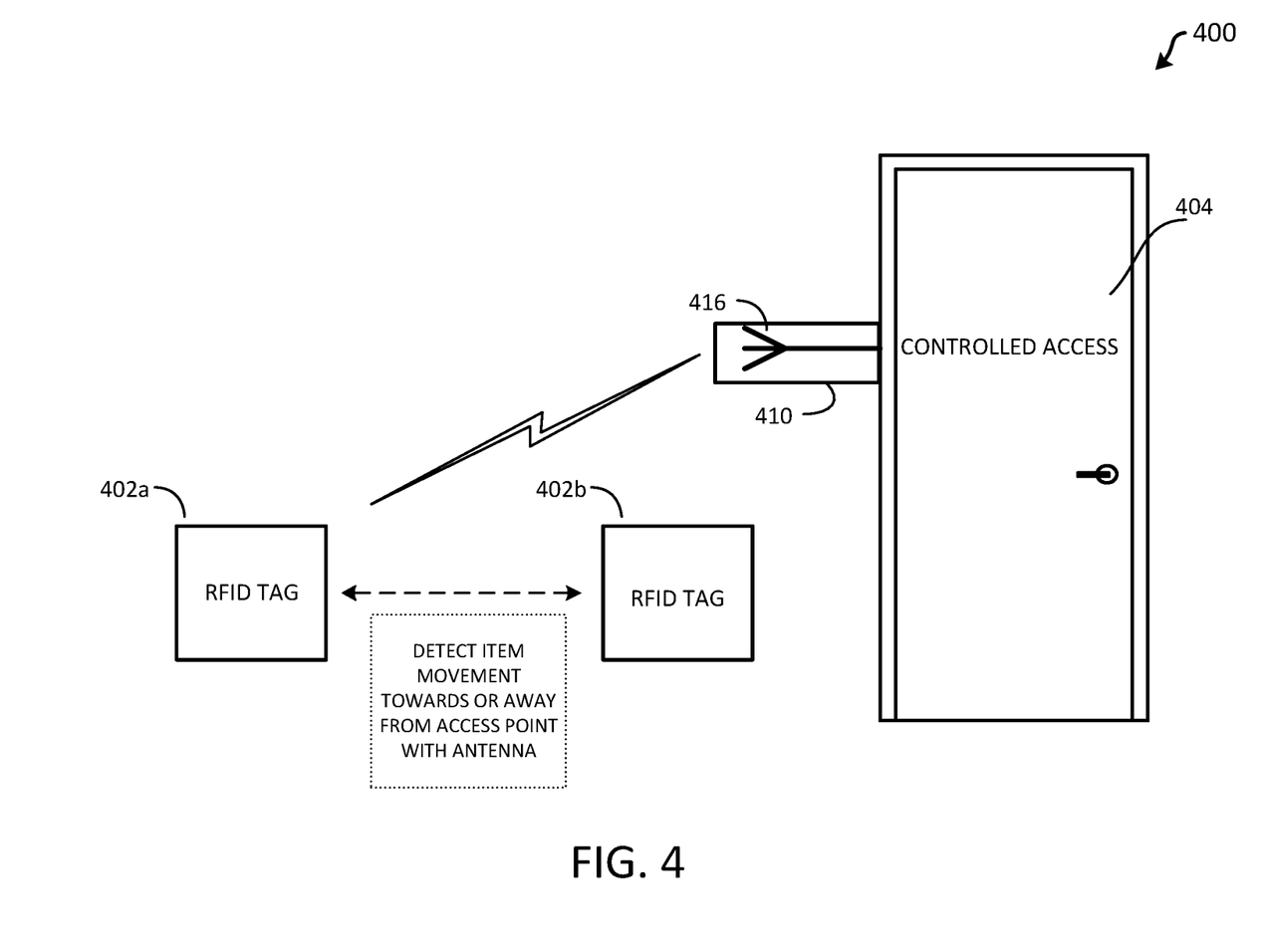
FIG. 4 illustrates an exemplary access control system of the present disclosure.

FIG. 4 illustrates an example implementation of an access control system 400. In this example, an RFID tag 402 is associated with a wireless asset (not shown), such as a user or an object. An access control reader 410 is provided at a controlled access point 404, illustrated here as a lockable door. As described previously, access control reader 410 contains a transceiver with a switchable, oscillating near-field and far-field antenna 416.

In the illustrated example, a wireless asset or user associated with RFID tag 402 seeks access to the controlled access point 404, and begins at a first position 402a, some distance remote from both controlled access point 404 and access control reader 410. For example, this distance may be 25 feet, which is within the operating range of a far-field configuration of switchable antenna 416, but is not within the operating range of a near-field configuration of switchable antenna 416.

Consequently, as antenna 416 oscillates between a near-field configuration and a far-field configuration, RFID tag 402 will only be detected by the far-field configuration, becoming effectively invisible to antenna 416 while in the near-field configuration, as described previously. While in far-field configuration, access control system 410 may detect that RFID tag 402 is approximately 25 feet away, based on the received signal strength of a return signal received the RFID tag 402.

As the wireless asset or user associated with RFID tag 402 continues to approach controlled access point 404, it will continue to be detected only by the far-field configuration of switchable antenna 416, wherein access control system 410 may update a detected distance to RFID tag 402 accordingly. Additionally, access control system 410 may calculate or update a detected velocity of RFID tag 402. In some embodiments, the access control system 400 may predict that the wireless asset or user associated with RFID tag 402 plans to seek access to controller access point 404, and may run a pre-authorization in order to expedite the process. This pre-authorization process may be identical to a normal authorization process, or may simply involve initiating any communication channels or databases associated with the authorization process. In some embodiments, the pre-authorization process may activate a camera (not shown) with a field of view covering controlled access point 404 and the surrounding area. This recording may be saved for a pre-determined amount of time, deleted if authorization is granted, or flagged and forwarded to security personnel if authorization is denied.

The wireless asset or user associated with RFID tag 402 may then cross a threshold defining the operating range of the near-field configuration of switchable antenna 416, arriving at a second position 402b. At this point, RFID tag 402 may be detected by both the near-field configuration and the far-field configuration of switchable antenna 416. In some instances, RFID tag 402 may be detected by only the near-field configuration, due to the polarity issues that can affect far-field antennas, as described previously.

Once RFID tag 402 is detected by the near-field configuration of switchable antenna 416, and authorization is granted, the wireless asset or user associated with RFID tag 402 may pass through or otherwise access controlled access point 404, wherein the likelihood of any false, missing, or otherwise erroneous readings relating to RFID tag 402 is greatly reduced in comparison to any access control systems known in the art.

Figure 5A:
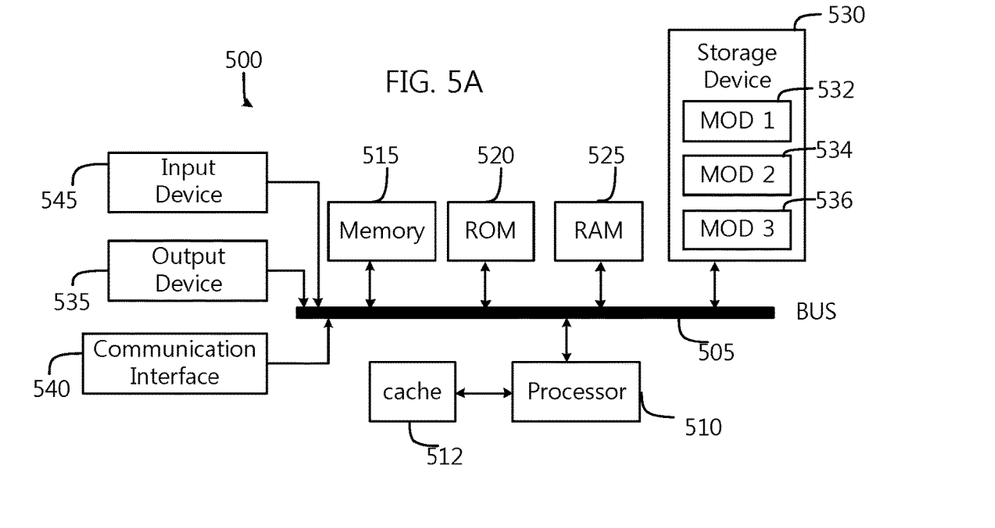
FIG. 5A illustrates a conventional system bus computing system architecture that can be used in implementing a system of the present disclosure.
Figure 5B:
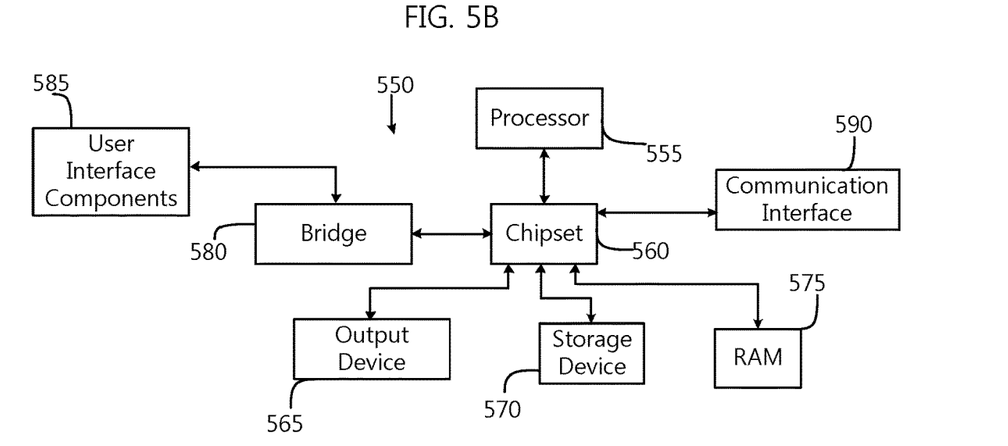
FIG. 5B illustrates a computer system having a chipset architecture that can be used in executing a method of the present disclosure.

FIG. 5A, and FIG. 5B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 wherein the components of the system are in electrical communication with each other using a bus 505. Exemplary system 500 includes a processing unit (CPU, processor, microprocessor, or microcontroller (MCU))) 510 and a system bus 505 that couples various system components including the system memory 515, such as read only memory (ROM) 520 and random access memory (RAM) 525, to the processing unit 510. The system 500 can include a cache of high-speed memory connected directly with, in close proximity to, or integrated as part of the processing unit 510. The system 500 can copy data from the memory 515 and/or the storage device 530 to the cache 512 for quick access by the processing unit 510. In this way, the cache can provide a performance boost that avoids processing unit 510 delays while waiting for data. These and other modules can control or be configured to control the processing unit 510 to perform various actions. Other system memory 515 may be available for use as well. The memory 515 can include multiple different types of memory with different performance characteristics. The processing unit 510 can include any general purpose processor and a hardware module or software module, such as module 1 532, module 2 534, and module 3 536 stored in storage device 530, configured to control the processing unit 510 as well as a special-purpose processor where software instructions are incorporated into the actual processor design. The processing unit 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processing unit 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations, such as a CPU, MCU (microcontroller), or microprocessor. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that exemplary systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. An access control system comprising:
a controller; and
a transceiver coupled to the controller, wherein the transceiver comprises an antenna module including a near-field antenna and a far-field antenna, and wherein the near-field antenna is a subset of the far-field antenna;
wherein the controller is configured to perform operations comprising:
oscillating the antenna module at a predetermined frequency between a first scanning mode and a second scanning mode different from the first scanning mode;
determining, from signals received from the wireless asset during the second scanning mode, whether the wireless asset is moving toward a controlled access point;
initiating, in response to a positive result of the determining, pre-authorization of the wireless asset to access the controlled access point; and completing, in response to at least the initiating and subsequent signals received from the wireless asset during the second scanning mode, authorization for the wireless asset to access the controlled access point;
wherein the first scanning mode corresponds with use of the near-field antenna, and
wherein the second scanning mode corresponds with use of the far-field antenna.

2. The access control system of claim 1, wherein the controller is configured to perform operations comprising:
the oscillating scans, using the transceiver, one or more RFID tags, wherein each RFID tag is associated with a corresponding wireless asset;
receiving, via the transceiver, a one or more return signals from each of the RFID tags; and
determining a location of each wireless asset based on the one or more return signals received from each RFID tag associated with the wireless asset.

3. The access control system of claim 2, wherein the controller is configured to perform operations comprising:
receiving two or more return signals from the RFID tag; and
determining a direction of the wireless asset based on the two or more return signals.

4. The access control system of claim 2, further comprising:
transmitting position information corresponding with one or more of the location of the wireless asset and the direction of the wireless asset to a cloud controller, wherein the cloud controller is configured to receive position information from a plurality of networked asset control systems.

5. The access control system of claim 2,
wherein the use of the near-field antenna corresponds to either use of the near-field antenna without the far-field antenna or in combination with the far-field antenna, and
wherein use of the far-field antenna corresponds to either use of the far-field antenna without the near-field antenna or in combination with the near-field antenna.

6. The access control system of claim 2, wherein the return signal comprises signal strength and phase information associated with the RFID tag.

7. The access control system of claim 1, wherein either the first or second mode is use of the near-field antenna in combination with the far-field antenna.

8. A method for tracking a wireless asset relative to a controlled access point, comprising:
scanning, using a transceiver, an RFID tag of a wireless asset, wherein the transceiver comprises an antenna module including a near-field antenna and a far-field antenna, the scanning comprising:
oscillating the antenna module at a predetermined frequency between a first scanning mode and a second scanning mode different from the first scanning mode,
wherein the first scanning mode corresponds with use of the near-field antenna, and
wherein the second scanning mode corresponds with use of the far-field antenna;
receiving a one or more return signals from the RFID tag; and
determining a location of the wireless asset based on the one or more return signals;

determining, from signals received from the wireless asset during the second scanning mode, whether the wireless asset is moving toward the access controlled access point;
initiating, in response to a positive result of the determining, pre-authorization of the wireless asset to access the controlled access point; and
completing, in response to at least the initiating and subsequent signals received from the wireless asset during the second scanning mode, authorization for the wireless asset to access the controlled access point.

9. The method of claim 8, wherein the near-field antenna is a subset of the far-field antenna.

10. The method of claim 8, further comprising:
receiving two or more return signals from the RFID tag; and
determining a direction of the wireless asset based on the two or more return signals.

11. The method of claim 8, further comprising:
transmitting position information corresponding with one or more of the location of the wireless asset and a direction of the wireless asset to a cloud controller, wherein the cloud controller is configured to receive position information from a plurality of networked asset control systems.

12. The method of claim 8,
wherein the use of the near-field antenna corresponds to either use of the near-field antenna without the far-field antenna or in combination with the far-field antenna, and
wherein the use of the far-field antenna corresponds to either use of the far-field antenna without the near-field antenna or in combination with the near-field antenna.

13. The method of claim 8, wherein either the first or second mode is use of the near-field antenna in combination with the far-field antenna.

14. A non-transitory computer-readable storage medium comprising instructions stored therein, which when executed by one or more processors, cause the processors to perform operations comprising:
scanning, using a transceiver, one or more RFID tags associated with one or more wireless assets, wherein the transceiver comprises an antenna module including a near-field antenna and a far-field antenna, the scanning comprising:
oscillating the antenna module at a predetermined frequency between a first scanning mode and a second scanning mode different from the first scanning mode,
wherein the first scanning mode corresponds with use of the near-field antenna, and
wherein the second scanning mode corresponds with use of the far-field antenna;
receiving a one or more return signals from each RFID tag;
determining, from signals received from the wireless asset during the second scanning mode, whether the wireless asset is moving toward a controlled access point;
initiating, in response to a positive result of the determining, pre-authorization of the wireless asset to access the controlled access point; and
completing, in response to at least the initiating and subsequent signals received from the wireless asset during the second scanning mode, authorization for the wireless asset to access the controlled access point;

determining a location of each wireless asset based on the one or more return signals received from each RFID tag associated with the wireless asset.

15. The non-transitory computer-readable storage medium of claim 14, wherein the near-field antenna is a subset of the far-field antenna.

16. The non-transitory computer-readable storage medium of claim 14, wherein the processor is further configured to perform operations comprising:
  receiving two or more return signals from the RFID tag; and
  determining a direction of the wireless asset based on the two or more return signals.

17. The non-transitory computer-readable storage medium of claim 14, wherein the processor is further configured to perform operations comprising:
  transmitting position information corresponding with one or more of the location of the wireless asset and a direction of the wireless asset to a cloud controller, wherein the cloud controller is configured to receive position information from a plurality of networked asset control systems.

18. The non-transitory computer-readable storage medium of claim 14:
  wherein use of the near-field antenna corresponds to either use of the near-field antenna without the far-field antenna or in combination with the far-field antenna, and
  wherein the use of the far-field antenna corresponds to either use of the far-field antenna without the near-field antenna or in combination with the near-field antenna.

19. The non-transitory computer-readable storage medium of claim 14, wherein the return signal comprises signal strength and phase information associated with the RFID tag.

20. The medium of claim 14, wherein either the first or second mode is use of the near-field antenna in combination with the far-field antenna.

* * * * *